United States Patent Office 3,291,701
Patented Dec. 13, 1966

3,291,701
BETA-CAROTENE PRODUCTION AND COMPOSITION THEREFOR
Roland C. Fulde, Downers Grove, Ill., assignor to Swift & Company, Chicago, Ill., a corporation of Illinois
No Drawing. Filed July 6, 1962, Ser. No. 208,111
17 Claims. (Cl. 195—28)

This application is a continuation-in-part of my co-pending application Serial Number 14,529 filed March 14, 1960 and now abandoned.

This invention relates generally to the production of vitamin material. More particularly, the invention relates to a method for producing beta-carotene and related carotenoids.

Historically, beta-carotene and the related carotenoid pigments have been available only by separation from plant materials. Carotenoids are widely disseminated, being found with chlorophyll and xanthophyll in the green parts of plants; they also occur in carrots, many seeds, and several fats, thus the natural yellow color of butter. Various methods of recovery from plant material by the use of suitable mixtures of immiscible solvents are available. Recently, carotene has been chemically synthesized and recognized as a precursor of vitamin A, so vital for general well-being in man and animals. Human visual efficiency, for example, is closely related to and largely dependent upon the availability of this vitamin. Vertebrates, as a rule, appear unable to synthesize carotene or vitamin A, and that which they require must be taken in with their food.

More recently, it has been found that beta-carotene and other carotenoids may be produced by microorganisms, particularly the yeasts and fungi belonging to the order Mucorales, disclosed and described in Patent No. 2,865,814 and Patent No. 2,890,989. The family Choanephoraceae has been found to be particularly effective. Such microbiological production of beta-carotene is usually carried out in a process referred to as "submerged fermentation" in which the carotene producing organisms are cultivated in a liquid nutrient medium under agitation. One such medium developed contains 2.3% cracked corn, 4.7% hexane extracted soybean meal, 4.0% vegetable oil or animal fat, thiamine, monobasic potassium phosphate nonionic detergent and beta-ionone. Carotene production begins after an incubation period of about 48 hours and continues for about 3 or 4 days thereafter. A filter cake is obtained containing up to 0.5% beta-carotene.

The utilization of beta-ionone in the nutrient medium and the addition of fatty materials are comparatively recent developments which have been found to be highly advantageous. Beta-ionone serves as a precursor for the production of beta-carotene, and according to the submerged culture method, optimum yields are obtained when beta-ionone is added after the preliminary 48-hour incubation period. However, a disadvantage encountered in the use of beta-ionone is its comparatively high price, often making up half of the ingredient cost of the nutrient medium even though used in very small quantities.

Since the conditions attending the commercial practice of the submerged culture technique sometimes place undesirable restrictions on optimum production of beta-carotene, a still more recent improvement has been the development of a satisfactory surface growth process described in my co-pending application for patent Serial No. 7,083, filed February 8, 1960 and now U.S. Patent 3,095,-357. I found that in this method, as opposed to submerged culture, increased amounts of fatty materials essential for optimum carotene production may be beneficially tolerated. Surface growth is a comparatively simple and rapid method of carotene production, but the addition of beta-ionone was still found necesary for satisfactory yields.

It is therefore an object of this invention to provide an improved medium for the microbiological production of beta-carotene and related carotenoids.

It is a further object of this invention to provide a medium for producing beta-carotene which is more efficient than media known heretofore.

It is a still further object of this invention to provide a medium for cultivating growth of microorganisms such that optimum yields of beta-carotene are obtained with greatly reduced costs.

It is another object of this invention to provide an effective medium for the microbiological production of beta-carotene without the addition of the beta-ionone.

Further objects and advantages, if not specifically set forth, will become apparent to one skilled in the art during the course of the following description.

Broadly, this invention relates to the microbiological production of beta-carotene and related carotenoids by either of the fermentation processes referred to as submerged culture and surface growth. I have found that growth of microorganisms may be carried out efficiently and to remarkable advantages over prior methods by cultivating such growth in the presence of readily available citrus peel materials. The increased mold growth and consequent improved carotene production may be largely correlated with the particular composition of the nutrient medium which has been developed.

More particularly, it has been found that optimum yields of beta-carotene from members of the family Choanephoraceae are obtained when the molds are cultivated in the presence of a nutrient medium containing ground citrus peel. Fresh orange peels in small particles have been found to be particularly effective, as has the commercially available citrus meal. Citrus meal is produced in most cases by grinding dried citrus pulp and is sometimes made by screening the small particles from the pulp. Citrus pulp comprises the peel, rag and seeds of oranges together with varying amounts of that of grapefruit, tangerines and lemons, depending upon the production of the locality from which the pulp is obtained. It has been found that the citrus peel material is an effective substitute for beta-ionone in submerged culture, serving as a precursor and acting as a stimulant for carotene production. Even more efficient is the substitution in surface fermentation. The amounts of surface bearing material necessary are greatly reduced or may at times be omitted entirely. Furthermore, in both techniques several added advantages are noted. One such advantage is that the citrus peel material retards the growth of contaminating organisms which otherwise cause destruction of the carotene. This effect is noted particularly with the surface culture process where contaminating organisms are retarded during the entire 2 to 3 day incubation period. This is important since it is well known that ordinarily contamination in the lengthy submerged culture proceeds so rapidly that yields are diminished or destroyed. Secondly, the citrus peel material also serves as an effective antioxidant in the culture media. When using beta-ionone as a precursor, there is oftentimes simultaneous synthesis and destruction of carotenoids, while with citrus peel material the destruction is substantially eliminated. Still another advantage is the production of beta-carotene without the possibility of a taint of coal tar derivatives.

The citrus peel materials utilized herein to obtain the improved yield as has been noted previously include citrus peels, citrus meal and citrus peel by-products. Citrus peels are very high in pectin content containing the natural complex of citrus pectin, citrus hemi-cellulose, and citrus cellulose. Citrus meal, which along with citrus press water and citrus molasses which contain constituents of citrus peel or citrus peel by-products, is derived from oranges primarily, although grapefruit and tangerine peels are sometimes present. The term citrus peel materials as used herein is intended to denote those compositions containing natural citrus peel constituents such as ground citrus peels, citrus meal, citrus press water, citrus molasses, and other extractable constituents of citrus peels which may be derived therefrom by water extraction or extraction with organic solvents such as acetone, diethyl ether, chloroform, petroleum ether, etc.

The various cultures of the family Choanephoraceae may be cultivated in any convenient manner and in any medium which promotes abundant mycelial growth. Preferably, each organism may be cultivated according to methodology of aerobic continuous culture propagation. When the culture is needed for use in beta-carotene production, it may be drawn off and utilized. One inoculum medium found successful comprised 7% soybean meal, 2% glucose, 0.1% monobasic potassium phosphate and 0.0002% thiamine. An aqueous mixture of the above ingredients was sterilized for 15 minutes at 15 pounds steam pressure.

The nutrient media for either fermentation method may include any type of ingredients suitable for microorganism growth, usually containing a base of carbohydrates such as starch or starch conversion products, proteins either animal or vegetable, and fats. Suitable fatty materials, defined as fatty acids and combined fatty acids, comprise generally any vegetable oil, any animal fat or their products of hydrolysis. More specifically, it has been found that the animal fats including white grease, yellow grease, brown grease, prime tallow, No. 2 tallow, No. 1 tallow or their products of hydrolysis such as red oil (commercial oleic acid) are satisfactory. Additionally, vegetable fats such as corn oil, cottonseed oil, soybean oil, palm oil, coconut oil, olive oil, peanut oil or their products of hydrolysis are also satisfactory. A mixture of red oil and No. 2 tallow has been found to be particularly effective, more so than either alone.

One preferred nutrient medium for submerged culture includes corn steep water, animal stick liquor, citrus meal and red oil. Fresh orange peels may also be used in submerged culture, but in lesser amounts due to the physical nature of the peels and the pectin which is present. A preferred nutrient composition in surface culture comprises steamed soybean meal, red oil, tallow and orange peel. Another contains animal stick liquor, corn steep water, red oil and citrus meal. Both compositions may, of course, be used in conjunction with surface bearing material (ground or whole oat hulls, ground corn cobs, soybean hulls, cottonseed hulls, wheat bran, peanut hulls, sawdust, and certain inorganic materials) which may or may not contribute additional nutritive factors. Any portion of the nutrient culture mixture may or may not be subjected to an autoclaving procedure prior to its inclusion to the nutrient. Good results have been noted when autoclaving has not been practiced. This is due partly to the apparent selective action of the citrus peel material and partly since the surface incubation period of approximately 24 hours with a mass inoculation is short enough that contaminants initiating growth during this period ordinarily not troublesome. Of course, if it is determined that contaminants are present and causing lower yields, autoclaving could be beneficial. When fresh orange peels are used, it is preferable to neutralize them to a pH of about 6.3. They are then drained and added to the remaining nutrient ingredients.

I have found that unlike the submerged culture technique of the prior art wherein optimum yields of carotenoids are obtained when beta-ionone is added after 48 hours of incubation, the addition of the citrus peel material may be made initially at the time of formulating the nutrient mixture. This permits the rapid selective growth of carotene-producing molds and, consequently, the yield is increased. The incubation of the culture mixtures may be carried out in various ways using any type of equipment by which portions of the material may be effectively brought into contact with air at an optimum temperature.

The operable hydrogen ion concentration for the beginning of the incubation is generally in the range of 5 to 7, although the preferred optimum will vary with the particular microorganisms and the particular nutrients included. When, for example, soybean meal with a pH of 6.5 to 6.6 is used, the addition to soybean hulls containing red oil and tallow lowers the pH to about 5.9. However, when the mixture of animal stick liquor and corn steep water is used, the pH is adjusted to about 5.7 prior to autoclaving. As noted above, orange peels are generally neutralized to a pH of 6.3. Generally, no further adjustment of pH is necessary during the incubation period.

The amounts of inoculum added to the nutrient mixture is not critical. Ordinarily amounts of mixed or single strains in the range of about 5% to about 10% in submerged culture and from about 10% to about 20% in surface fermentation by volume of the complete nutrient mixture are used although slightly lesser or considerably greater amounts may be used with corresponding changes in yields. The temperature of the incubation should be kept within the range of 20° to 35° C. with about 27° C. being optimum. A relative humidity of 100% is preferred though not necessary in the surface method to minimize drying during incubation.

After incubation is complete, a product is obtained which is high in beta-carotene content. This product may be fed to animals directly or mixed with other suitable feed ingredients. Alternately, the carotenoids may be extracted with a suitable solvent. Since beta-carotene is labile in the presence of oxygen, subsequent treatment of the cultured material should be ideally conducted in the absence of air. Extraction with a solvent meets this problem since the solvent atmosphere excludes air. Also, the carotene may be stabilized. It has been found that the use of antioxidants such as butylated hydroxyanisole (BHA), butylated hydroxytoluene (BHT) and santoquin may be added to the surface bearing material together with the inoculum and the stability of the resulting carotene is greatly improved. For example, about .04 of 1% BHA increases the carotene stability of the resultant product which is dried in air for 24 hours and then held at 98° F. for four weeks. Larger amounts may be more effective.

The following examples are given by way of illustration and are not intended to limit this invention. Many variations and embodiments of the present invention may be made without departing from the spirit and scope thereof, the invention being limited only as defined in the appended claims.

*Example I*

A culture mixture comprising:

| | Percent |
|---|---|
| Ground oat hulls | 13.0 |
| Soybean meal | 6.0 |
| Red oil | 5.0 |
| No. 2 tallow | 5.0 |
| Orange peel | 55.0 |
| Blakeslea trispora NRRL 2456 | 8.0 |
| Blakeslea trispora NRRL 2457 | 8.0 | was formulated by the following procedure: The orange peels were cut into particles ranging in size from about 2 to about 8 mm. in diameter in a blender, placed in a vessel with sufficient water to cover and neutralized with sodium hydroxide slowly over a period of one hour to a pH of 6.3. The orange peels were drained and added with the cultures of the remaining ingredients with brief mixing. The final mixture was placed in an incubation at 27° C. for 24 hours in shallow pans. A dry product was obtained which contained 692 micrograms of carotene per gram of product (523,360 units vitamin A per pound).

*Example II*

A culture mixture comprising:

| | Percent |
|---|---|
| Ground oat hulls | 3.0 |
| Soybean meal | 6.0 |
| Red oil | 7.5 |
| No. 2 tallow | 7.5 |
| Orange peel | 60.0 |
| Blakeslea trispora NRRL 2456 | 8.0 |
| Blakeslea trispora NRRL 2457 | 8.0 | was formulated and incubated according to the procedure outlined in Example I. The dry product contained 683 micrograms of carotene per gram of product (516,652 units vitamin A per pound).

*Example III*

A culture mixture comprising:

| | Percent |
|---|---|
| Ground oat hulls | 8.0 |
| Soybean meal | 6.0 |
| Red oil | 5.0 |
| No. 2 tallow | 5.0 |
| Orange peel | 60.0 |
| Blakeslea trispora NRRL 2456 | 8.0 |
| Blakeslea trispora NRRL 2457 | 8.0 | was formulated and incubated according to the procedure set forth in Example I. The dry product contained 705 micrograms of carotene per gram of product (533,450 units vitamin A per pound).

The results of the preceding examples indicate that different fat concentrations may be employed along with varying concentrations of surface bearing material. In Example II, only 3% such material was employed and in this case might be eliminated entirely. In its place, other surface bearing material might be substituted or the amounts of soybean meal or fat might be increased.

*Example IV*

A culture mixture comprising:

| | Percent |
|---|---|
| Citrus meal | 18.0 |
| Red oil | 5.0 |
| No. 2 tallow | 5.0 |
| Soybean meal | 17.0 |
| Water | 39.0 |
| Blakeslea trispora NRRL 2456 | 8.0 |
| Blakeslea trispora NRRL 2457 | 8.0 | was formulated according to the following procedure: The red oil and tallow were mixed with the citrus meal and soybean meal, and a blend of the water and cultures dispersed thereon. The final mixture was placed in an incubator at 27° C. for 40 hours in shallow pans. A dry product was obtained containing 1298 micrograms of carotene per gram of product (982,000 units vitamin A per pound).

*Example V*

A culture mixture comprising:

| | Percent |
|---|---|
| Citrus meal | 25.0 |
| Red oil | 5.0 |
| No. 2 tallow | 5.0 |
| Soybean meal | 6.0 |
| Water | 42.0 |
| Blakeslea trispora NRRL 2456 | 8.0 |
| Blakeslea trispora NRRL 2457 | 8.0 | was formulated and incubated according to the procedure set forth in Example IV. The dry product contained 1840 micrograms of carotene per gram of product (1,391,964 units vitamin A per pound). This example illustrates the increase in yield resulting from an increased amount of citrus meal and a slightly longer incubation period.

*Example VI*

A submerged culture medium comprising (per hundred ml. of media):

| | Percent |
|---|---|
| Corn steep water | 4.8 |
| Animal stick liquor | 1.5 |
| Citrus meal | 4.0 |
| Red oil | 4.0 |
| Blakeslea trispora NRRL 2456 | 5.0 |
| Blakeslea trispora NRRL 2457 | 5.0 | was formulated according to the following procedure: The corn steep water and animal stick liquor were mixed with the citrus meal and the pH adjusted to 5.8. The red oil was added, the mixture autoclaved at 15 pounds steam pressure for 15 minutes, placed in a flask and inoculated with the cultures. The flask was placed on a rotary shaker set at 200 r.p.m. and incubated for 5 days at 27° C. A carotene yield per hundred ml. of media of 46,580 micrograms (77,633 units vitamin A) was obtained.

*Example VII*

This example illustrates the fact that the process is applicable to organisms other than those noted in the preceding examples. Four mixtures of media were prepared according to Example V. The conditions of incubation were identical and also according to those of Example V. The inoculum was composed of 8 ml. each of the vegetative mycelium of the pairs of organism listed in the following table.

The carotene yields obtained with the various organisms are summarized in Table I.

TABLE I

| Organism Used | Beta-carotene (Units Vitamin A Per Pound of Product) |
|---|---|
| Blakeslea circinans NRRL 2546 | 431,509 |
| Blakeslea circinans NRRL 2548 | |
| C. circurbitarum NRRL A-6097 | 153,116 |
| C. circurbitarum NRRL A-6098 | |
| C. conjuncta NRRL 2560 | 194,875 |
| C. conjuncta NRRL 2561 | |

It is clear that many modifications and variations of the invention as hereinbefore set forth may be made without departing from its spirit and scope, and therefore only such limitations should be imposed as are indicated in the appended claims.

I claim:

1. A process for producing beta-carotene which comprises cultivating beta-carotene producing microorganisms of the family Choanephoraceae in the presence of a nutrient medium assimilable by said microorganisms, said nutrient medium containing citrus peel materials, and incubating the microorganisms under aerobic conditions conducive to active growth.

2. The process of claim 1 wherein the citrus peel material is in the form of orange peels in small particles.

3. The process of claim 1 wherein the citrus peel material is in the form of citrus meal.

4. A process for preparing beta-carotene which comprises cultivating beta-carotene producing microorganisms of the family Choanephoraceae in a nutrient medium including citrus peel materials and incubating the microorganisms under submerged aerobic conditions conducive to active growth.

5. The process of claim 4 wherein the citrus peel material is in the form of orange peels in small particles.

6. The process of claim 4 wherein the citrus peel material is in the form of citrus meal.

7. A process for producing beta-carotene which comprises dispersing a culture of beta-carotene producing microorganisms of the family Choanephoraceae on a finely comminuted material having a large surface area, said material containing nutrients including citrus peel materials and incubating the inoculated material under surface aerobic conditions conducive to active growth.

8. The process of claim 7 wherein the citrus peel material is small particles of orange peel.

9. The process of claim 7 wherein the citrus peel material is citrus meal.

10. A composition for the production of beta-carotene comprising: beta-carotene producing microorganisms of the family Choanephoraceae; carbohydrates; proteins; fatty materials; citrus peel material; and the pH of the composition being within the range of 5 to 7.

11. The composition of claim 10 in which the carbohydrates and proteins are provided by a mixture of corn steep water and animal stick liquor.

12. The composition of claim 10 in which the carbohydrates and proteins are provided by a particulate vegetable material.

13. The composition of claim 10 in which the citrus peel material is in the form of orange peels in small particles.

14. The composition of claim 10 in which the citrus peel material is in the form of citrus meal.

15. A method of improving the microbiological production of beta-carotene by *Blakeslea trispora* comprising fermenting a culture of *Blakeslea trispora* in a fermentation medium containing a carbohydrate source and a citrus molasses additive.

16. A method of improving the microbiological production of beta-carotene by *Blakeslea trispora* comprising fermenting a culture of *Blakeslea trispora* in a fermentation medium containing a carbohydrate source and a citrus peel material selected from the group consisting of citrus peel, citrus meal and citrus molasses.

17. A process for producing beta-carotene which comprises cultivating beta-carotene producing microorganisms of the family Choanephoraceae in a nutrient medium containing a citrus peel material selected from the group consisting of citrus peels, citrus meal, citrus press water, citrus molasses, water extractable constituents of citrus peels, organic solvent extractable constituents of citrus peels, and mixtures thereof; and incubating the microorganisms under aerobic conditions conducive to active growth.

No references cited.

A. LOUIS MONACELL, *Primary Examiner.*

ABRAHAM H. WINKELSTEIN, *Examiner.*

A. E. TANENHOLTZ, *Assistant Examiner.*